UNITED STATES PATENT OFFICE.

JONAS W. AYLSWORTH, OF EAST ORANGE, NEW JERSEY, ASSIGNOR OF ONE-HALF TO FRANK L. DYER, OF MONTCLAIR, NEW JERSEY.

NON-INFLAMMABLE LUBRICANT AND PROCESS OF PREPARING THE SAME.

1,028,926.   Specification of Letters Patent.   Patented June 11, 1912.

No Drawing.   Application filed October 14, 1910.   Serial No. 587,043.

*To all whom it may concern:*

Be it known that I, JONAS W. AYLSWORTH, a citizen of the United States, and a resident of East Orange, in the county of Essex and State of New Jersey, have invented a certain new and useful Non-Inflammable Lubricant and Process of Preparing the Same, of which the following is a description.

My invention relates to a new composition of matter for use as a lubricating agent and has for its object the provision of such a composition having certain new and useful properties and also a process for preparing the same.

The valuable lubricating properties of graphite and oil are well known, but the tendency of the graphite to settle out of the oil greatly impairs the usefulness of such mixtures. In the present invention, an oil is produced which retains the graphite in suspension and has the additional property of being difficultly inflammable.

The lubricant forming the subject matter of this application is composed of a mixture of finely divided graphite and a liquid halogen substitution product of naphthalene, preferably a chlorin substitution product. The oily liquid chloro-naphthalene alone is not a sufficiently good lubricator, but the combination of the same with finely divided graphite, either alone or in combination with a thickening ingredient, forms an excellent lubricator having very desirable properties. Owing to its high specific gravity and peculiar penetrating and spreading properties and its high boiling point, it forms an excellent medium for holding the finely divided graphite in suspension and spreading the same over bearing surfaces. Since it is heavier than water, it may be used to advantage for lubricating machinery which is run in water.

The oil when thickened with some of the solid chloro-naphthalenes and containing .25% to 5% of graphite forms an excellent lubricant for the bearings of car axles and other bearings which frequently become hot from hard service and cause fires when the ordinary well known lubricants are used.

The graphite in suitable fine state of division is prepared by the prolonged kneading of a pure flake graphite with a sticky viscid semi-solid substance between rolls, such as are used for rubber mixing, and subsequently dissolving out the sticky substance, washing the graphite with the solvent, drying, and mixing with chloro-naphthalene. Rosin may be used for the sticky substance, in which case the rolls are heated to the point where the rosin becomes sticky, and after grinding with the graphite a sufficient length of time, the rosin may be removed by solution in gasolene and the substance washed with the gasolene. Molasses boiled down to a semi-solid condition may also be used in place of the rosin, in which case water may be used to remove the molasses, with the addition of an acid or alkali to hasten the settling of the graphite.

I have found that small percentages of rubber dissolved in the liquid chloro-naphthalene greatly enhance the lubricating power of the liquid chloro-naphthalene. $\frac{1}{2}$% to 2% of rubber may be added, either alone or together with from 20 to 60% of a higher chloro-naphthalene, such as the tri or tetra-chloro-naphthalene.

An example of an oil which will remain liquid at ordinary temperatures is the following:—liquid chloro-naphthalene, 1000 parts by weight; solid tri or tetra chloronaphthalene, 200 to 600 parts by weight; rubber, 10 parts by weight; finely divided graphite, 3 to 50 parts by weight.

An example of a heavy oil or grease is the following:—liquid chloro-naphthalene, 500 parts; solid higher chloro-naphthalene, 500 to 1000 parts; rubber, 5 to 10 parts; finely divided graphite, 10 to 100 parts.

After the ingredients have been mixed, which should be done hot, the mixture is cooled to a low temperature and made into a uniform paste by grinding through a paint mill. Lubricating hydrocarbon oil may be mixed with any of the above described compositions, if desired.

Having now described my invention, what I claim and desire to protect by Letters Patent is as follows:

1. As a new composition of matter, a lubricant comprising finely divided graphite and a chlorin substitution product of naphthalene, substantially as described.

2. As a new composition of matter, a lubricant comprising a liquid halogen substitution product of naphthalene and finely divided graphite in suspension therein, substantially as described.

3. As a new composition of matter, a lubricant comprising a liquid halogen substitution product of naphthalene, finely divided graphite, and a thickening agent, substantially as described.

4. As a new composition of matter, a lubricant comprising liquid chloro-naphthalene, finely divided graphite, and solid chloro-naphthalene, substantially as described.

5. As a new composition of matter, a lubricant comprising liquid chloro-naphthalene, finely divided graphite, solid chloro-naphthalene, and a small percentage of rubber dissolved in the liquid, substantially as described.

6. As a new composition of matter, a lubricant comprising liquid chloro-naphthalene containing from .25% to 5% of finely divided graphite suspended therein, substantially as described.

7. As a new composition of matter, a lubricant comprising liquid chloro-naphthalene compounded with from 20 to 60% of a solid higher chloro-naphthalene, and from ½ to 2% of rubber dissolved therein and having finely divided graphite suspended therein, substantially as described.

8. As a new composition of matter, a lubricant comprising liquid chloro-naphthalene compounded with a hydrocarbon oil and having finely divided graphite suspended therein, substantially as described.

9. As a new composition of matter, a lubricant comprising liquid chloro-naphthalene compounded with a hydrocarbon oil thickened with a solid higher chloro-naphthalene, and having finely divided graphite suspended therein, substantially as described.

10. As a new composition of matter, a lubricant comprising liquid chloro-naphthalene compounded with a hydrocarbon oil thickened with a solid higher chloro-naphthalene carrying a small percentage of dissolved rubber, and having finely divided graphite suspended therein, substantially as described.

11. The process of preparing a lubricant, which consists in kneading flake graphite with a sticky viscid substance, dissolving out the latter, and mixing the resulting finely divided graphite with liquid chloro-naphthalene, substantially as described.

12. The process of preparing a lubricant, which consists in kneading flake graphite with a sticky viscid substance, dissolving out the latter, and mixing the resulting finely divided graphite with liquid chloro-naphthalene and dissolving a small percentage of rubber therein, substantially as described.

This specification signed and witnessed this 8th day of October 1910.

JONAS W. AYLSWORTH.

Witnesses:
DYER SMITH,
ANNA R. KLEHM.